US006132074A

United States Patent [19]

Bristle et al.

[11] Patent Number: 6,132,074

[45] Date of Patent: Oct. 17, 2000

[54] HEADLIGHT FOR A VEHICLE

[75] Inventors: Ursula Bristle, Boll; Juergen Mueller, Albstadt; Heike Eichler; Thomas Kienzler, both of Reutlingen; Doris Boebel, Stuttgart, all of Germany

[73] Assignee: Robert Bosch GmbH, Stuttgart, Germany

[21] Appl. No.: 09/390,924

[22] Filed: Sep. 7, 1999

[30] Foreign Application Priority Data

Sep. 11, 1998 [DE] Germany ........................... 198 41 557

[51] Int. Cl.[7] ........................................ B60Q 1/00

[52] U.S. Cl. ............................... 362/538; 362/455

[58] Field of Search ............................ 362/538, 520, 362/522, 308, 309, 332, 335, 336, 539, 338, 455

[56] References Cited

U.S. PATENT DOCUMENTS

| | | | |
|---|---|---|---|
| 3,598,989 | 9/1971 | Biggs | 362/308 |
| 3,743,385 | 7/1973 | Schaefer | 362/718 |
| 4,642,514 | 2/1987 | English | 313/111 |
| 4,797,790 | 1/1989 | Brodling | 362/538 |
| 5,091,830 | 2/1992 | Suzuki | 362/539 |
| 5,580,150 | 12/1996 | Bertling | 362/538 |

FOREIGN PATENT DOCUMENTS 32 18 703 A1 11/1983 Germany .

*Primary Examiner*—Sandra O'Shea
*Assistant Examiner*—Hargobind S. Sawhney
*Attorney, Agent, or Firm*—Michael J. Striker

[57] ABSTRACT

A headlight for a vehicle has a reflector, a light source, a lens through which a light reflected by the reflector passes, at least one optical element which surrounds the lens, the optical element being formed as at least one ring-shaped lens element and together with the lens forming an optical unit in appearance.

9 Claims, 1 Drawing Sheet

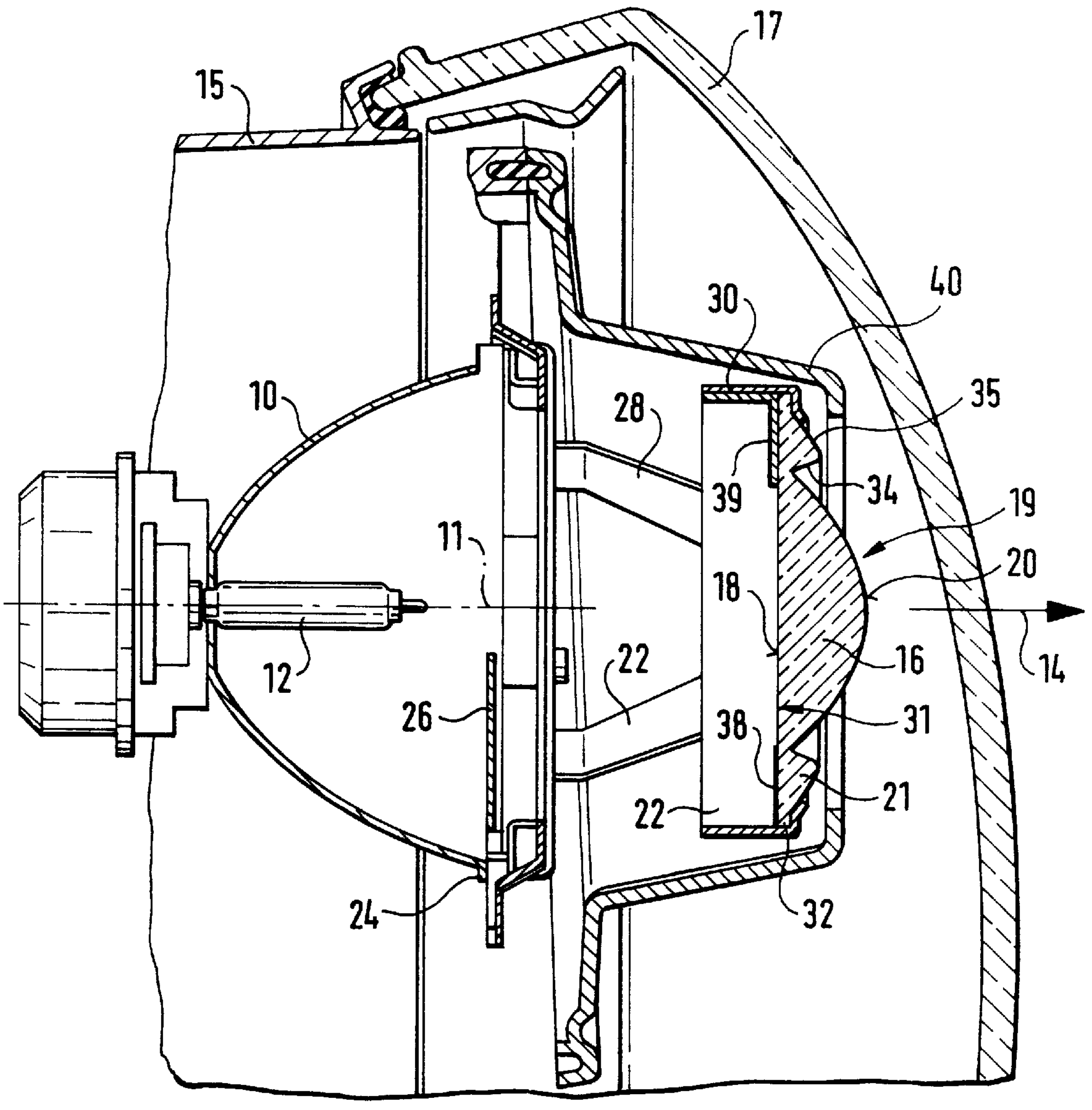
17
15
40
30
35
10
28
39
34
19
11
20
18
12
22
16
14
26
38
31
21
22
24
32

HEADLIGHT FOR A VEHICLE

BACKGROUND OF THE INVENTION

The present invention relates to headlights for vehicles.

More particularly, it relates to a headlight which has a reflector, a light source and a lens for passing the reflected light. A headlight of the above mentioned general type is disclosed for example in the German patent document DE 32 18 703 A1. This headlight has a reflector, a light source and a lens which is arranged so that the light reflected by the reflector passes through the lens. Moreover, the headlight has a light-permeable element which surrounds the lens at least over a part of its periphery, so that the light emitted by the light source and not engaged by the reflector can pass through the light-permeable element and can be collected. For this purpose the element is provided with prisms through which the passing light is deviated. With this design of the element, when the light source is turned on, the illuminating surface of the reflector is increased with regard to the surface of the lens. When however the light source is turned off, the element is perceived as dark and the headlight has an undesirable, non-uniform appearance.

SUMMARY OF THE INVENTION

Accordingly, it is an object of present invention to provide a headlight for a vehicle, which avoids the disadvantages of the prior art.

In keeping with these objects and with others which will become apparent hereinafter, one feature of present invention resides, briefly stated, in a headlight, in which the optical element is composed of at least one ring-shaped lens element formed for example of one piece with the lens and together with the lens perceived visually as an optical element.

When the headlight is designed in accordance with the present invention it has the advantage that due to the ring-shaped lens element in connection with the lens, an optical unit is formed which on a plan view on the headlight increases the diameter of the optically occurring image of the lens.

In accordance with another feature of the present invention the lens element with the lens have together a common base which faces the light source and an edge region which is connected with the holder of the optical unit. The lens and the lens element are held of one piece in a common holder.

The lens element can be formed as a optically active element which corresponds to the profile of the lens in accordance with a further embodiment of the present invention. Still in accordance with another embodiment of the present invention a lens can be used for lights beam detection, while the lens element serves exclusively for increasing the visual image of the lens and the light source of the headlight is not operative.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a headlight for a vehicle in accordance with the present invention.

DESCRIPTION OF PREFERRED EMBODIMENTS

A headlight for a vehicle, in particular for a motor vehicle shown in FIG. 1 is formed for example in accordance with a projection principle and operates for producing of at least low beam. A headlight has a reflector 10 composed of a synthetic plastic or metal, and a light source 12 inserted in its apex region. The light source 12 can be formed as an incandescent lamp, a gas discharge lamp, or another suitable lamp.

An optical unit 19 composed of glass or synthetic plastic is arranged after the reflector 10 as considered in a light outlet direction 14. It has for example a flat side 18 which faces the reflector 10 and a convexly curved side 20 which faces in an opposite direction. The optical unit 19 is held in a holder 22 which can be connected with a front edge 24 of the reflector 10 facing in the light outlet direction 14. The reflector 10 and the optical element 19 can be arranged in a housing 15. The housing has a light outlet opening which is covered by a light-permeable cover member or disk 17 composed of glass or synthetic plastic. The cover disk 17 can be smooth so that the light can pass through it without being influenced. Alternatively, it can be provided at least locally with optical elements which deviate the passing light, for example disperse the light.

The optical unit 19 has a lens 16 and a lens element 21 which surrounds the lens. The light emitted by the light source is reflected as a converging light bundle which passes through the lens 16 and is deviated. The lens 16 operates as a collecting lens, and the light passing through it is refracted to the optical axis 11 of the reflector 10. The reflector 10 can have for example an approximately ellipsoidal shape, an ellipsoid-like shape, or an numerically determined shape produced from the characteristic of the light bundle to be reflected by the reflector 10.

A light-impermeable screen 26 can be arranged between the reflector 10 and the lens 16. It is arranged substantially under the optical axis 11 and allows a passage of only a part of the light bundle reflected by the reflector 10. The light bundle passing on the screen 26 obtains a bright-dark limit which is determined by the upper edge of the screen 26. It is formed by the lens 16 as the bright-dark limit of the low beam bundle exiting the headlight. Alternatively, the screen 26 can be dispensed with, when the shape of the reflector 10 is determined so that the light bundle reflected by it already has the required bright-dark limit which is formed by the lens 16.

The holder 22 can form one or several webs 28 extending from the front edge 24 of the reflector 10 to the vicinity of the optical unit 19. It can be connected with one another for example by a ring-shaped portion 30. The optical unit 19 is held with its edge 32 in this portion. Furthermore, a side orifice 40 adjoins the portion 30 of the holder 22.

The lens 16 operates as described for forming the reflected light bundle, while the lens element 21 which surrounds the lens 16 does not take active part in the formation of the light emitted by the light source. The lens element 21 is formed as a ring-shaped element at the side of the cover disk 17 and has a prismatic cross-section. It is composed of the same material as the lens 16 which is connected of one piece with it. The lens element 21 is has a cross-section which is provided with a steep flank 34 at the side of the lens 16. The flank 34 in the region of a base 31 merges in a rounded fashion into the lens 16 and also merges in rounded fashion in flat flank 35 which faces away from the lens 16.

The flat flanks are formed substantially arcuately in a cross-section similarly to the curvature of the lens 16 and end at the outer periphery of the optical unit 19 at the edge 32. Thereby the lens element 21 represents an element in which the rays passing through it can be deviated, or in other words it can be optically active. Simultaneously, the outer diameter of the optical element 19 is increased with regard to an original diameter of the lens 16. The visual image of a plan view of the optical unit 19 from the side of the cover disk 17, when the light source 12 is not operative is enlarged, when compared with an embodiment without the lens element 21. For forming the light bundle it is however sufficient and desired to provide only the lens 16, since exclusively this lens deviates the light rays.

The base 31 at the side of the light source in the region of the lens element 21 is provided with a cover coating 38. The cover coating prevents that the additionally the light reflected by the reflector 10 can pass through the lens element 21, which can produce undesired light dissipation. The covering can be actuated also by a screen 39 which is alternatively identified in the drawings. The screen 39 can be formed for example as a ring-shaped metal plate which is connected with a ring-shaped portion 30 of the holder 32. It is advantageous when the optical properties of the headlight are maintained with the use of a lens 16 which is not changeable in its construction, and nevertheless it is possible to enhance the visual impression on the plan view. If it is desired with the same technical values of the lens 16 to provide such a greater diameter as can be achieved by the use of the lens-shaped element 21, then the same structural length from the light source to the cover disk the lens must be constructed differently, so that with a greater diameter it has a relatively small focal distance. This would require expensive additional calculations and an additional expense for production of the lens.

It will be understood that each of the elements described above, or two or more together, may also find a useful application in other types of constructions differing from the types described above.

While the invention has been illustrated and described as embodied in headlight for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a vehicle, comprising a reflector; a light source; a lens through which a light reflected by said reflector passes; at least one ring-shaped lens element which surrounds said lens, said at least one ring-shaped lens element together with said lens forming an optical unit in appearance, said ring-shaped lens element with said lens having a joint base which faces said light source and has an edge region; a holder for said optical unit, said edge region of said ring-shaped lens element being connected with said holder, said ring-shaped lens element being arranged between said holder and said lens, said ring-shaped lens element being visible when viewed toward a light outlet direction when said optical unit is connected with said holder.

2. A headlight as defined in claim 1, wherein said ring-shaped lens element is formed of one piece with said lens.

3. A headlight as defined in claim 2, wherein said base has a circular edge at a region for connection of said lens element and said lens with said holder.

4. A headlight as defined in claim 1, wherein at least said flat flank has an arcuate cross-section.

5. A headlight as defined in claim 4, wherein a transition between said steep flank to said adjoining lens in a region of said base and a transition of said steep flank to said flat flank are rounded.

6. A headlight as defined in claim 1, wherein said ring-shaped lens element has means for preventing a passage through said lens element of a light emitted by said light source.

7. A headlight as defined in claim 6, wherein said means is formed as a cover coating provided on said base at a side facing said light source in a region of said ring-shaped lens element.

8. A headlight as defined in claim 7, wherein said means has a ring-shaped screen which is connected with said holder.

9. A headlight for a vehicle, comprising a reflector; a light source; a lens through which a light reflected by said reflector passes; at least one ring-shaped lens element which surrounds said lens, said at least one ring-shaped lens element together with said lens forming an optical unit in appearance, said ring-shaped lens element with said lens having a joint base which faces said light source and has an edge region; a holder for said optical unit, said edge region of said ring-shaped lens unit being connected with said holder, said ring-shaped lens element at a side facing away from said base having a substantially prism-shaped cross-section and has a steep flank which adjoins said lens and a flat flank which faces away from said lens.

* * * * *